United States Patent [19]
Grabow

[11] Patent Number: 4,702,153
[45] Date of Patent: Oct. 27, 1987

[54] APPARATUS FOR VENTING A KITCHEN, ESPECIALLY AN ONBOARD KITCHEN IN AN AIRCRAFT

[75] Inventor: Dieter Grabow, Buxtehude, Fed. Rep. of Germany

[73] Assignee: Messerschmitt-Boelkow-Blohm, Munich, Fed. Rep. of Germany

[21] Appl. No.: 798,731

[22] Filed: Nov. 15, 1985

[30] Foreign Application Priority Data

Nov. 20, 1984 [DE] Fed. Rep. of Germany ....... 3442304

[51] Int. Cl.⁴ .............................................. F24C 15/20
[52] U.S. Cl. ........................................ 98/1; 98/115.1; 126/299 R; 126/299 D; 244/118.5
[58] Field of Search ....................... 126/299 D, 299 R; 98/115.1, 115.3

[56] References Cited

U.S. PATENT DOCUMENTS

| | | | |
|---|---|---|---|
| 3,104,961 | 9/1963 | Westlin | 126/299 D |
| 3,260,189 | 7/1966 | Jensen | 126/299 D |
| 3,393,497 | 7/1968 | Donnelly | 126/299 D X |
| 4,205,965 | 6/1980 | Bielefeldt | 55/1 |

Primary Examiner—Harold Joyce
Attorney, Agent, or Firm—W. G. Fasse; D. H. Kane

[57] ABSTRACT

An onboard kitchen for an aircraft includes at least one kitchen unit with a counter top, a kitchen sink and a venting hood connected to an air exhaust conduit. A cyclone type separator is connected with its inlet and outlet ports into the exhaust air conduit thus connecting the separator to the venting hood. The cyclone type separator divides the airflow into a clean airflow which is led into a clean air discharge conduit and into a contaminating particles carrying airflow which is led into a discharge pipe connected to a drainage duct which connects the kitchen sink, preferably to a drainage pylon outside the aircraft body. The use of filters is thus avoided and the maintenance costs are minimized.

2 Claims, 4 Drawing Figures

VIEW A

4,702,153

APPARATUS FOR VENTING A KITCHEN, ESPECIALLY AN ONBOARD KITCHEN IN AN AIRCRAFT

FIELD OF THE INVENTION

The invention relates to an apparatus for venting a kitchen, especially an onboard kitchen in an aircraft. Such kitchens include the conventional kitchen equipment, such as a countertop, a kitchen sink and the like, as well as at least one venting hood.

DESCRIPTION OF THE PRIOR ART

Kitchens, especially commercial kitchens, are generally equipped with some type of venting device including a venting hood located above the range or stove. In an aircraft kitchen the venting hood is normally located above a counter top and connected to an exhaust fan for sucking any vapors produced by the cooking or heating of food out of the kitchen. In order to avoid the deposition of contaminations, especially of fat droplets and dust in the duct leading from the venting hood to the suction fan, various types of filters are used which are located directly in the venting hood. These filters are supposed to collect contaminating particles. However, it is necessary to frequently and regularly exchange these filter mats. The costs for new filter mats and the work needed for the replacement may be substantial.

OBJECTS OF THE INVENTION

In view of the foregoing it is the aim of the invention to achieve the following objects singly or in combination:

to provide a venting system which will avoid the need for filter mats and which will simultaneously substantially reduce the maintenance work needed for the venting system;

to collect any contaminations from the venting system automatically for guiding the contaminations to a discharge point; and to connect a plurality of suction or venting points to a common exhaust duct.

SUMMARY OF THE INVENTION

According to the invention the present kitchen venting system is equipped with at least one cyclone type particle separator which divides the airstream coming from the exhaust hood and carrying the particles to be separated into a clean air flow and into a contaminated air flow. The clean air flow is led into a clean air exhaust conduit and the contaminated air flow carrying the separated particles is led into a discharge pipe. The discharge pipe is connected to a discharge port for the separated particles. Preferably, the discharge pipe is connected to the outflow of the kitchen sink leading into a drainage duct, preferably connected to a draining pylon leading out of the aircraft body.

The main advantages of the invention are seen in that replacement filters are no longer required and that the operation of this type of venting system substantially does not require any maintenance work other than repair work.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
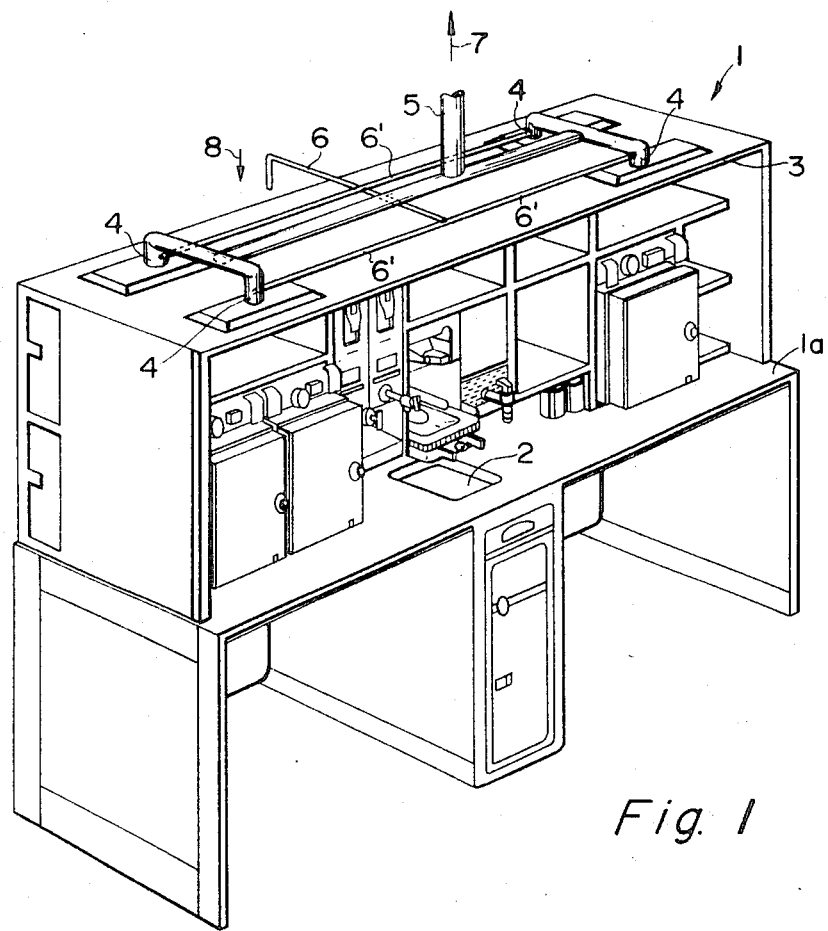
FIG. 1 is a perspective view of a kitchen counter for an onboard kitchen in an aircraft.

FIG. 1 shows perspectively a kitchen unit 1 for use in an onboard kitchen in an aircraft. The kitchen unit 1 comprises a counter top 1a, a kitchen sink 2 and a venting hood 3. The venting hood 3 is equipped with, for example, four cyclone type particle separators 4 connected with their outlets to an exhaust or suction conduit 5 which in turn is connected to a common exhausts or suction fan 5a driven by a motor 5b and having a clean air discharge 5c.

Figure 2:
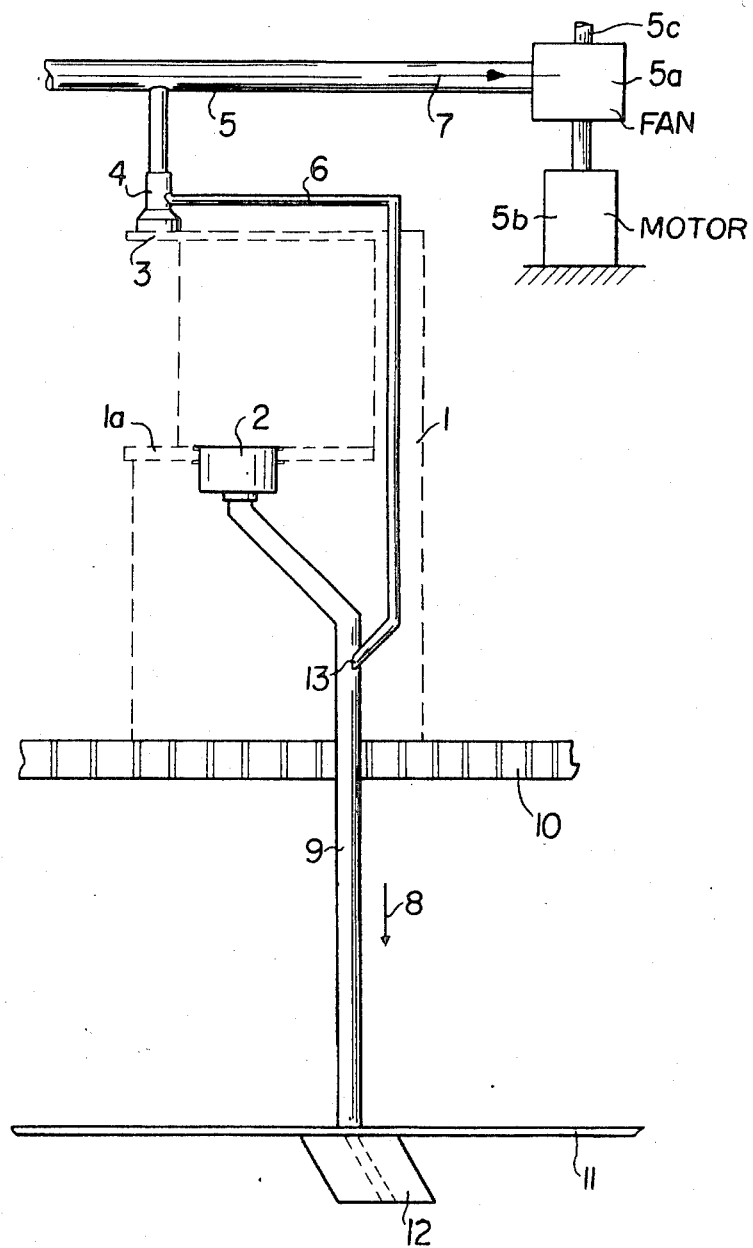
FIG. 2 illustrates a schematic diagram for an onboard kitchen according to FIG. 1.

Inside each cyclone type separator 4 the particles carrying air stream coming from the exhaust hood 3 is divided into a clean air stream leading to the exhaust conduit 5 and into a contaminated air stream leading to a discharge pipe 6. Preferably, the discharge pipe 6 is connected to the drainage duct 9 of the sink 2 as best seen in FIG. 2. The drainage duct 9 leads through the aircraft body wall or skin to the outside, whereby the outlet or exit port of the drainage pipe leads into a reduced pressure zone of the outside airflow.

If the suction fan 5a is operating, a suction airflow is generated in the exhaust conduit 5 as indicated by the arrow 7 so that a cyclone type eddy flow is generated in the separators 4 and this eddy flow causes any particles entrapped by the exhaust hood 3 to pass into the discharge pipe 6. The reduced pressure prevailing in the drainage duct 9 makes sure that a reduced pressure is also maintained within the discharge pipe 6 and this reduced pressure in turn maintains an outwardly directed transport flow for moving the separated particles in the direction indicated by the arrow 8 so that these particles may be discharged to the space outside the aircraft.

Suitable cyclone type separators are described, for example in U.S. Pats. Nos. 4,001,121 and 4,205,965 which can be modified for the present purposes by changing their dimensions. However, generally any cyclone type separator is suitable for the present purposes. Thus, centrifugal separators known under the tradename "Centrisep" are also useful for practicing the invention.

The separation of the particles in such cyclone or centrifugal separators takes place primarily due to the airflow involved which imparts a centrifugal force to the particles. Such cyclone type separators have not been used heretofore in connection with kitchen exhaust fans. It is the expectation and understanding in the art of cyclone separators that particles, especially fat and water droplets, as well as oil particles, are not suitable for centrifugal separation because such particles mix with dust particles, thereby caking up inside the separator and producing a growing layer of deposits on the inner surfaces of the cyclone type separator. As a result, the efficiency of such separators would be impaired rather quickly. However, tests performed according to the invention have shown surprisingly that caking took place very slowly so that in comparison with the filter mat solution the maintenance intervals are twenty times greater.

FIG. 2 shows a conduit diagram of a kitchen according to FIG. 1, whereby the kitchen unit 1 with its counter top 1a and the hood 3 are shown by dashed lines. One cyclone type separator 4 connected to the exhaust conduit 5 is shown above the hood 3 and communicates with the space under the hood through a hole in the hood 3. The drainage duct 9 leading away from the kitchen sink 2 passes through the cabin floor 10 and is connected to a drainage pylon 12 located outside of the aircraft body wall or skin 11. The drainage pylon 12 has an aerodynamic shape in such a way that within the drainage duct 9 a reduced pressure is created by the external airflow. The discharge pipe 6 transporting the separated particles, leads into the drainage duct 9 below the kitchen sink 2 as shown at 13.

Figure 3:
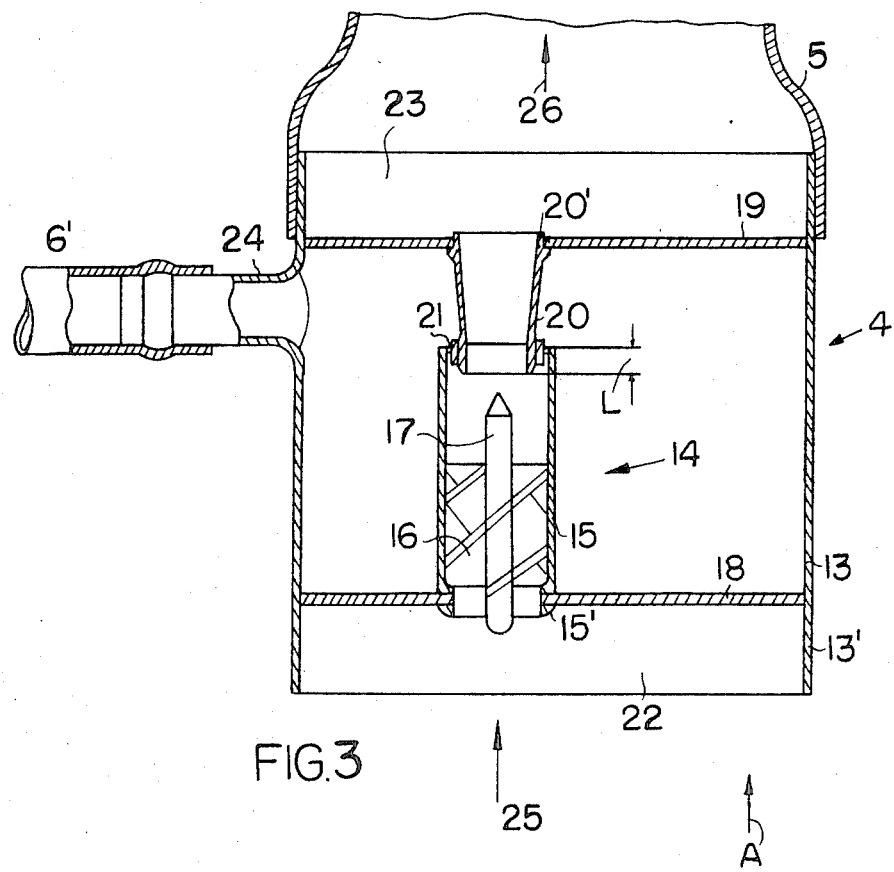
FIG. 3 is an enlarged sectional view of a cyclone type separator as used herein.
Figure 4:
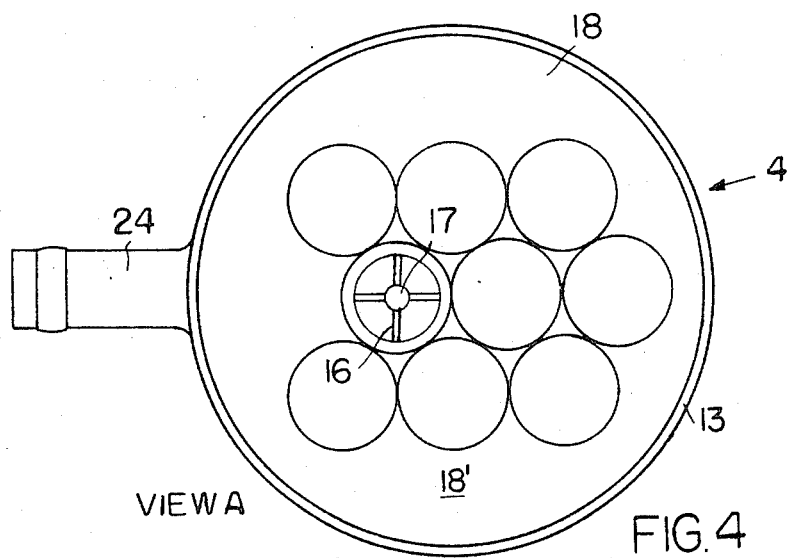
FIG. 4 is a view in the direction A in FIG. 3.

FIGS. 3 and 4 show a cyclone type separator 4 which as such is known under the tradename "Centrisep". Such a separator 4 comprises a cylindrical housing 13 enclosing several separating sections 14. Only one separating section 14 is shown in detail. Each separating section comprises a substantially cylindrical housing 15. Each housing holds several helical guide members 16 connected to a central body 17 having a configuration which is symmetric relative to a central rotational axis. The housing 15 of each section 14 has a lower edge 15' mounted in an opening 18' of a lower cross wall 18 which in turn is mounted in the common housing 13. The mounting is such that the central longitudinal axis of the common housing 13 extends in parallel to the longitudinal axis of each of the individual housing 15. The lower edge 15' of each individual housing 15 is sealed relative to the mounting wall 18 so that air flowing into the common housing 13 as indicated by the arrow 25 in FIG. 3 must enter into the individual housings 15.

An upper cross wall 19 is rigidly mounted in an upper region of the common housing 13. The upper cross wall 19 is also provided with holes arranged in vertical alignment with the holes 18' in the bottom wall 18. Discharge pipe sections 20 are rigidly mounted with their upper ends 20' in the mounting holes of the upper cross wall 19 and in axial alignment with the respective individual housing 15. The discharge pipe sections 20 have a conical axial section and reach with a length L axially into the respective individual housing 15, thereby forming a ring gap 21 between the housing 15 and the lower end of the discharge pipe section 20.

When the common housing 13 is installed its lower end 13' cooperates with an opening or connecting flange member of the discharge or exhaust hood 3. The upper discharge opening 23 of the separator housing 13 is connected to the exhaust conduit 5 while a radially extending discharge pipe section 24 is connected to the discharge pipe 6 through branch lines 6'.

In operation, air carrying particles to be separated travels in the direction of the arrow 25 into the separator 4 and the flow guide members 16 cause a rotation of the moving air, whereby the particles are subjected to centrifugal forces causing the particles to travel along helical paths in each housing 15 so that the particles to be discharged reach the ring gap 21 while the cleaned air travels into the pipe section 20 and into the exhaust conduit 5 as indicated by the arrow 26. A partial airflow is branched off into the discharge pipe 6 for the removal of the contaminations from the separator 4.

The just described features provide a venting for an aircraft kitchen which requires a minimal maintenance effort. This is so because man hours and material expenses, for example for new filters, are avoided. Further, the simple construction of the discharge pipe 6 and its connection to the drainage duct 9 which is provided anyway, greatly simplifies the present system and minimizes its costs. It has been found that the eddy flow noise created by the cyclone type separators 4 does not pass through the sink discharge opening into the cabin. This has been shown in tests that such noise nuisance is not generated by the present invention.

Although the invention has been described with reference to specific example embodiments, it will be appreciated, that it is intended to cover all modifications and equivalents within the scope of the appended claims.

What I claim is:

1. An apparatus for venting a kitchen, especially an onboard kitchen of an aircraft, comprising a counter top, a kitchen sink, a drainage duct connected to said kitchen sink, at least one exhaust conduit, an exhaust hood connected to said exhaust conduit, at least one cyclone separator (4) mounted in said exhaust conduit for dividing an airflow carrying contamination particles coming through said exhaust hood (3) into a clean airflow passing out of said exhaust conduit (5) and a contaminated airflow carrying separated contamination particles, and a discharge pipe (6) connected to said cyclone separator and to said drainage duct (9) for removing said contaminated airflow into said drainage duct (9).

2. The apparatus of claim 1, further comprising a drainage pylon (12) mounted on the outside of the aircraft, and wherein said drainage duct (9) is connected to said drainage pylon (12), whereby said discharge pipe (6) is also connected to said drainage pylon for producing reduced pressure in said drainage duct (9) and in said discharge pipe (6) by air flowing past said pylon outside said aircraft.

* * * * *